UNITED STATES PATENT OFFICE.

RICHARD LAUCH AND MYRTIL KAHN, OF ELBERFELD, GERMANY, ASSIGNORS TO THE FARBENFABRIKEN, VORMALS FR. BAYER & CO., OF SAME PLACE.

BLUE-BLACK AZO DYE.

SPECIFICATION forming part of Letters Patent No. 440,639, dated November 18, 1890.

Application filed October 4, 1888. Serial No. 287,195. (Specimens.) Patented in England November 30, 1887, No. 16,484; in France December 2, 1887, No. 187,365; in Austria-Hungary August 29,1888, No. 24 and No. 31; in Italy November 3, 1888, XLVII, 313, and XXII, 24,052, and in Spain December 7, 1888, No. 8,665.

*To all whom it may concern:*

Be it known that we, RICHARD LAUCH and MYRTIL KAHN, chemists, and subjects of the German Emperor, residing at Elberfeld, Prussia, Germany, have invented certain new and useful Improvements in the Manufacture of Blue-Black Azo Dye-Stuffs, (for which we have obtained Letters Patent in France, No. 187,365, dated December 2, 1887; in Great Britain, No. 16,484, dated November 30, 1887; in Spain, No. 8,665, dated December 7, 1888; in Italy, Vol. 47, No. 313, and Vol. 22, No. 24,052, dated November 3, 1888, and in Austria-Hungary, Tom. 40, Fol. 73, XXIV, 31, dated August 29, 1888;) and we do hereby declare the following to be a full, clear, and exact description of the invention, such as will enable others skilled in the art to which it appertains to make and use the same.

The invention relates to the manufacture of azo dye-stuffs or coloring-matter, and more especially to the manufacture of blue black for dyeing cotton, wool, and silk; and it consists in the mode or process of obtaining such coloring-matter, substantially as hereinafter described, and as set forth in the claims.

We have found that dye-stuffs derived from tetrazo compounds and naphthols (dioxynaphthalines) and their sulphonic acids may be materially improved in so far as the depth of color or the tint thereof is concerned by increasing the molecular weight of the coloring-matter by the introduction of alpha-naphthylamine. The dye-stuffs obtained by our process are very numerous, because every tetrazo compound of any paradiamine reacts with alpha-naphthylamine, and because the combination of these tetrazo compounds with alpha-naphthylamine may be greatly varied or modified. Under tetrazo compounds we understand those of benzidene, tolidine, diamido-diphenolether, diamidostilbene, naphthylene-diamine, their sulphones and their sulphonic acids, with the exception of benzidine and toluidine disulphonic acids.

In carrying out our invention we proceed as follows:

First. One molecule of these tetrazo compounds is combined with one molecule of alpha-naphthylamine, the reaction being soon completed. If the free muriatic acid is removed by the addition of acetate of soda without filtering, the intermediate products formed can be readily converted into tetrazo compounds by the addition to the mixture of an aqueous solution of the theoretical quantity of sodium nitrite and hydrochloric acid. The mixture is now allowed to stand for some hours, when the new tetrazo compounds will be formed, and these react like any other tetrazo compounds. If the formula

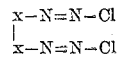

represents any tetrazo compound, the new tetrazo compounds have the following constitution:

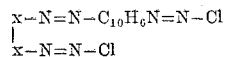

Therefore, in order to obtain a good blue-black coloring-matter the tetrazo compounds may be combined with two molecules of naphthols (dioxynaphthalines) and their sulphonic acids. For example: Coloring-matter from benzidine plus one molecule of alpha-naphthylamine, two molecules of alpha-naphthol-monosulphonic acid. Fifty kilograms of benzidine sulphate are converted in the well-known manner into the tetrazo compound, and to this solution is added a solution of twenty-six kilograms of alpha-naphthylamine in diluted hydrochloric acid. The intermediate product is readily formed if the muriatic acid is weakened by the addition of acetate of soda and the reaction is complete. The mixture is allowed to stand for some hours, after which we add fifty kilograms hydrochloric acid, and then an aqueous solution of thirteen kilograms of sodium nitrite and again allowing the mixture to stand for about twelve hours, when the new tetrazo compound will be formed, and is poured under constant stirring into a solution of eighty-eight kilograms of sodium alpha-naphtholmonosulphonate rendered alkaline by the addition of sodium carbonate, when the coloring-matter will immediately form and is filtered off and dried. It has the following composition:

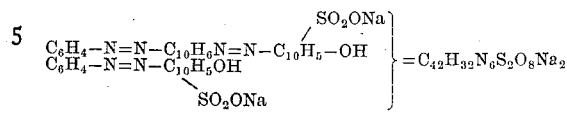

and forms a powder of metallic luster, which is difficultly soluble in cold water, easily in hot water with a violet color, but is totally insoluble in alcohol and benzine. In concentrated sulphuric acid the dye-stuff dissolves blue with a green-blue shade, which color on addition of water changes from blue violet to red violet and gives a violet-blue precipitate. On addition of soda-lye to a watery solution the violet color changes to a blue violet. Mineral acids separate the dye-stuff acid out of the watery solution as a violet-blue precipitate. It dyes unmordanted cotton in a hot soap-bath a bluish-violet color, which is fast to sunlight and does not turn red by heating.

Secondly. By combining one molecule of the above-mentioned tetrazo compounds with two molecules of alpha-naphthylamine the coloring-matter will be obtained. Those tetrazo compounds which are derived from benzidine, tolidine, diamidostilbene, and naphthylene-diamine are insoluble in water, and may be rendered soluble by sulphonation in a well-known manner.

All these dye-stuff diamido-azo compounds give new tetrazo compounds when treated as follows: They are finally divided and suspended in water, treated with hydrochloric acid and a solution of the theoretical quantity of sodium nitrite, the mixture being kept cool by the addition of ice, and allowed to stand for about twelve hours.

These new tetrazo compounds are of the following compositions:

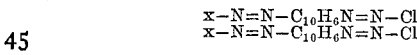

or

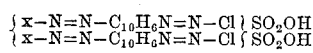

give new violet to blue-black coloring-matters, if they are treated in the same manner as exactly described under part I.

(Benzidine two molecules alpha-naphthylamine) sulphated, plus two molecules of alpha-naphtholmonosulphonic acid. To the solution of the tetrazo compounds of fifty kilograms of benzidine sulphate a solution of fifty-two kilograms of alpha-naphthylamine dissolved in hydrochloric acid is added. By the addition of acetate of soda to this mixture the formation of the coloring-matter is completed. After allowing it to stand for about twelve hours the insoluble dye-stuff is filtered off, dried, and converted into its sulpho-acids in a well-known manner by means of fuming sulphuric acid containing twenty per cent. of $SO^3$. The sulpho-acids are suspended in water in a finely-divided state and mixed with fifty kilograms hydrochloric acid and a solution of twenty-five kilograms of sodium nitrite.

The new tetrazo compound is formed, and after allowing the mixture to stand for twelve hours it is poured into a solution of eighty-eight kilograms of sodium alpha-naphthol-monosulphonate rendered alkaline by the addition of sodium carbonate, the dye-stuff being immediately formed. It has the following composition:

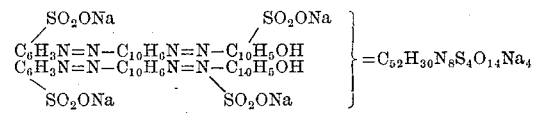

and forms an amorphous brown-black powder, which is soluble in cold water, easily in hot water, with a reddish-blue color, but insoluble in benzine and alcohol.

In concentrated sulphuric acid the dye-stuff dissolves black green. The watery solution changes, on addition of soda-lye, from reddish blue to a dull-greenish blue, and on addition of mineral acids to a watery solution the dye-stuff acid is separated as a dark-blue precipitate. It dyes unmordanted cotton in an alkaline soap-bath blue black, which is fast to sunlight and not changeable by heating.

Dye-stuffs from benzidine-sulphone-disulphonic acid + two molecules alpha-naphthylamine + two molecules alpha-naphtholmono-sulphonic acid. One hundred kilograms of benzidine-sulphone-disulphonic acid are converted in the well-known manner into their insoluble tetrazo compounds, and to this is added a solution of sixty-eight kilograms alpha-naphthylamine dissolved in hydrochloric acid. The combination takes place immediately, and the reaction being usually completed in about twelve hours, and this may be ascertained when a sample is found to dissolve readily in dilute alkali. To this mixture and without filtering we add thirty-four kilograms of nitrate, twelve hours being again allowed for the reaction to form the new tetrazo compound.

For the production of the new blue-violet coloring-matter the new tetrazo compound is poured into an alkaline solution of one hundred and twenty kilograms of alpha-naphthol-monosulphonic acid, and the dye-stuff formed is filtered off and dried. It has the following constitution:

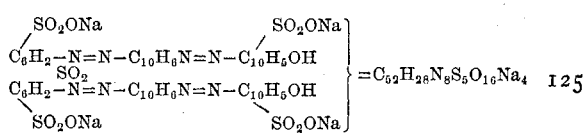

and forms a brown-black powder which is difficultly soluble in cold water, easily in hot water with a blue-violet color, but insoluble in alcohol and benzine. In concentrated sulphuric acids it dissolves violet. On addition of soda-lye the watery solution is changed to a dull blue, and mineral acids separate the dye-stuff acid out of the watery solution as a violet precipitate. It dyes unmordanted cotton a dark-bluish violet.

All the dye-stuffs obtained according to the described process possess in the fabric dyed therewith the characteristic property of being much more fast to sunlight than those products in which the dye-stuff molecules have not been increased by the introduction of one or more molecules of alpha-naphthylamine. They are, further, of darker shades than those, and possess the valuable property of retaining their shade when heated and not changing from blue to red.

Having described our invention, what we claim, and desire to secure by Letters Patent, is—

1. In the manufacture of violet to blue-black dye-stuffs, the improvement which consists in diazotizing a tetrazo compound or naphthol, (dioxynaphthaline,) and combining therewith one or more molecules of alpha-naphthylamine, as described.

2. As a new article of manufacture, violet to blue-black dye-stuffs, consisting of diazotized tetrazo compounds or naphthols, (dioxynaphthalines,) said dye-stuffs being soluble in hot water and insoluble in benzine and alcohol, and having the property of dyeing cotton without the use of a mordant, as set forth.

3. The herein-described process of obtaining violet to blue-black dyes, which consists in combining the described tetrazo compounds with one or two molecules of alpha-naphthylamine, (except the benzidine and toluidine disulphonic acids, which are combined with two molecules of alpha-naphthylamine,) diazotizing the resulting mono and diamido tetrazo compounds, whereby the latter series of products, which are insoluble in water, may be rendered soluble before the second diazotizing, and combining the new tetrazo compounds with naphthols (dioxynaphthalines) and their sulphonic acids, substantially as described.

In testimony whereof we affix our signatures in presence of two witnesses.

RICHARD LAUCH.
MYRTIL KAHN.

Witnesses:
ANTON KEUTER,
OTTO BRAUSEN.